United States Patent [19]
Ishimoto et al.

[11] Patent Number: 5,921,880
[45] Date of Patent: Jul. 13, 1999

[54] LOW NOISE ROLLER CHAIN

[75] Inventors: Eiji Ishimoto, Kyoto; Masatoshi Sonoda, Daitoh, both of Japan

[73] Assignee: Tsubakimoto Chain Co., Osaka-Fu, Japan

[21] Appl. No.: 08/919,791

[22] Filed: Aug. 29, 1997

[30] Foreign Application Priority Data

Sep. 2, 1996 [JP] Japan .................................. 8-232122

[51] Int. Cl.$^6$ ............................ F16G 13/02; F16G 13/04
[52] U.S. Cl. ........................ 474/207; 474/212; 474/231
[58] Field of Search .................................. 474/206, 207, 474/219, 231, 212

[56] References Cited

U.S. PATENT DOCUMENTS

| 1,925,055 | 8/1933 | Mize ............................................ 74/32 |
| 1,965,145 | 7/1934 | Klauke ........................................ 64/37 |
| 3,620,578 | 11/1971 | Fix ............................................ 474/207 |
| 3,948,574 | 4/1976 | Baylor ........................................ 474/207 |
| 4,123,947 | 11/1978 | Smith et al. ................................ 474/207 |
| 4,199,199 | 4/1980 | Granda ...................................... 474/207 |
| 4,494,945 | 1/1985 | Ogino ........................................ 474/219 |
| 4,668,025 | 5/1987 | MacDonald ................................ 474/207 |
| 4,729,754 | 3/1988 | Thuerman .................................. 474/207 |

FOREIGN PATENT DOCUMENTS

| 54-31848 | 3/1979 | Japan . |
| 62-62037 | 3/1982 | Japan . |
| 59-79656 | 5/1984 | Japan . |
| 396353 | 8/1933 | United Kingdom . |
| 552235 | 3/1943 | United Kingdom . |

Primary Examiner—John A. Jeffery
Assistant Examiner—Matthew A. Kaness
Attorney, Agent, or Firm—Armstrong, Westerman, Hattori, McLeland & Naughton

[57] ABSTRACT

A low noise chain has a bushing provided with a substantially cylindrical large diameter portion in an outer periphery of a central portion thereof. Inner plates are mounted respectively on opposite ends of the bushing. A hollow thin cylindrical roller, having inner peripheral surfaces opposed across a clearance, is capable of forming an oil film layer relative to an outer peripheral surface of the large diameter portion. The hollow thin cylindrical roller is rotatably externally fitted on the external outer peripheral surface of the bushing between the inner plates on opposite sides. A pair of O-rings is provided for sealing a clearance between both outer portions of the large diameter portion of the outer peripheral surface of the bushing and the inner peripheral surface of the hollow thin cylindrical roller. Outer plates are arranged on both outer sides of the inner plates on opposite sides. A chain pin rotatably extends through the bushing and has both ends mounted on the outer plates on both sides. Lubricating oil is sealed in a clearance formed between the pair of O-rings, the inner peripheral surface of the hollow thin cylindrical roller and the outer peripheral surface of the bushing. Thus, the low noise roller chain can obtain improved noise reducing effects.

4 Claims, 3 Drawing Sheets

LOW NOISE ROLLER CHAIN

FIELD OF THE INVENTION

The present invention relates to a low noise roller chain and more particularly, to a low noise roller chain provided with a construction for reducing noises generated when a roller is engaged with a toothed surface of a sprocket.

DESCRIPTION OF THE RELATED ART

For reducing noises generated by the collision between a roller and a toothed surface of a sprocket when a roller chain is engaged with the sprocket, an arrangement is disclosed in Japanese Patent Application Laid-Open No. 62-62037 Publication, wherein rollers are of a 3-layer construction, and a cushion member intervenes as an intermediate layer.

As shown in FIG. 3, a roller chain 11 is provided with the aforementioned noise reducing construction, both ends of a bushing 12 are fixedly fitted in a pair of inner plates 13, 13 and a roller 14 engaged with a toothed surface of a sprocket is rotatably fitted in the outer periphery of the bushing 12 between the inner plates 13, 13 on both sides, similar to a normal roller chain.

A chain pin 15 extends rotatably through the bushing 12. Both ends of the chain pin 15 are fixedly fitted in a pair of outer plates 16, 16 arranged on both outer sides of the inner plates 12, 12. O-rings 17, 17, for preventing the outflow of lubricating oil for lubricating between the bushing 12 and the chain pin 15, are interposed between the inner plate 12 and the outer plate 16 adjacent to each other widthwise of the roller chain 11.

In the roller chain 11, the roller 14 is composed of three layers, i.e., an inner roller portion 14A, a cushioned portion 14B and an outer roller portion 14C, in order from the inside to the outside. The intermediate cushioned portion 14B plays the part of absorbing the shock when the roller 14 impinges on the toothed surface of the sprocket to reduce the noise.

In the aforementioned roller chain having the construction shown in FIG. 3, a mechanical strength is necessary, to some extent, for material of the cushioned portion 14B in order to withstand the conditions similar to a roller made of steel used in a normal roller chain. However, when the strength of the cushioned portion 14B is increased, the dampening effect is reduced. Therefore, the prior art has the problem that not much noise reducing effect was obtained in consideration of the mechanical strength.

It is therefore an object of the present invention to solve the above-described problem with respect to prior art and to provide a low noise roller chain capable of obtaining an excellent noise reducing effect.

SUMMARY OF THE INVENTION

For achieving the aforesaid object, a low noise roller chain according to the present invention is provide which includes: a bushing having a substantially cylindrical large diameter portion in an outer periphery of a central portion; inner plates respectively mounted on opposite ends of the bushing; a hollow thin cylindrical roller having inner peripheral surfaces opposed through a clearance capable of forming an oil film layer relative to an outer peripheral surface of the large diameter portion and being rotatably externally fitted on the external outer peripheral surface of the bushing between the inner plates on opposite sides; a pair of O-rings for sealing a clearance between both outer portions of the large diameter portion of the outer peripheral surface of the bushing and the inner peripheral surface of the hollow thin cylindrical roller; outer plates arranged on both outer sides of the inner plates on opposite sides; and a chain pin rotatably extending through the bushing and having both ends mounted on the outer plates on both sides so that lubricating oil is sealed in a clearance formed between the pair of O-rings, the inner peripheral surface of the hollow thin cylindrical roller and the outer peripheral surface of the bushing.

In the low noise roller chain constructed as described above, an oil groove for storing lubricating oil is preferably formed in the outer peripheral surface of the large diameter portion of the bushing.

According to the present invention, when the low noise roller chain is not engaged with a sprocket, a uniform circumferential clearance is maintained between the outer peripheral surface of a large diameter portion of the bushing and the inner peripheral surface of the hollow thin cylindrical roller by the elasticity of the pair of O-rings, and lubricating oil moves into the clearance to form an oil film layer.

When the shock load is applied from the toothed surface of the sprocket to the outer peripheral surface of the hollow thin cylindrical roller as the hollow thin cylindrical roller comes in engagement with the toothed surface of the sprocket, the O-rings on both sides of the large diameter portion become elastically deformed so that the clearance between the inner peripheral surface of the hollow thin cylindrical roller and the outer peripheral surface of the large diameter portion of the bushing becomes narrow on the side, on which a load is applied, and lubricating oil in the clearance flows toward the opposite side to which a load is applied.

At that time, the pressure generated by the viscous resistance of lubricating oil supports the hollow thin cylindrical roller on the outer peripheral surface of the large diameter portion of the bushing, and the energy caused by the collision between the hollow thin cylindrical roller and the sprocket disappears due to the viscous resistance. However, since the hollow thin cylindrical roller is small in mass as compared with the normal roller, the dampening properties of the energy of the collision are extremely high to obtain the excellent noise reducing effect.

In the case where the oil groove for storing lubricating oil is formed in the outer peripheral surface of the large diameter portion provided in the bushing, when the toothed surface of the sprocket collides with the hollow thin cylindrical roller, a flow of lubricating oil from the side of the clearance on which the load was applied to the opposite side on which the load was applied is disturbed by the presence of the oil groove so that the consuming amount of the energy of the collision increases to further enhance the noise reducing effect. Further, since the lubricating oil is stored in the oil groove, the oil film layer between the inner peripheral surface of the hollow thin cylindrical roller and the outer peripheral surface of the large diameter portion of the bushing is maintained for long periods of time.

BRIEF DESCRIPTION OF THE DRAWING FIGURES

DETAILED DESCRIPTION OF THE INVENTION

Figure 1:
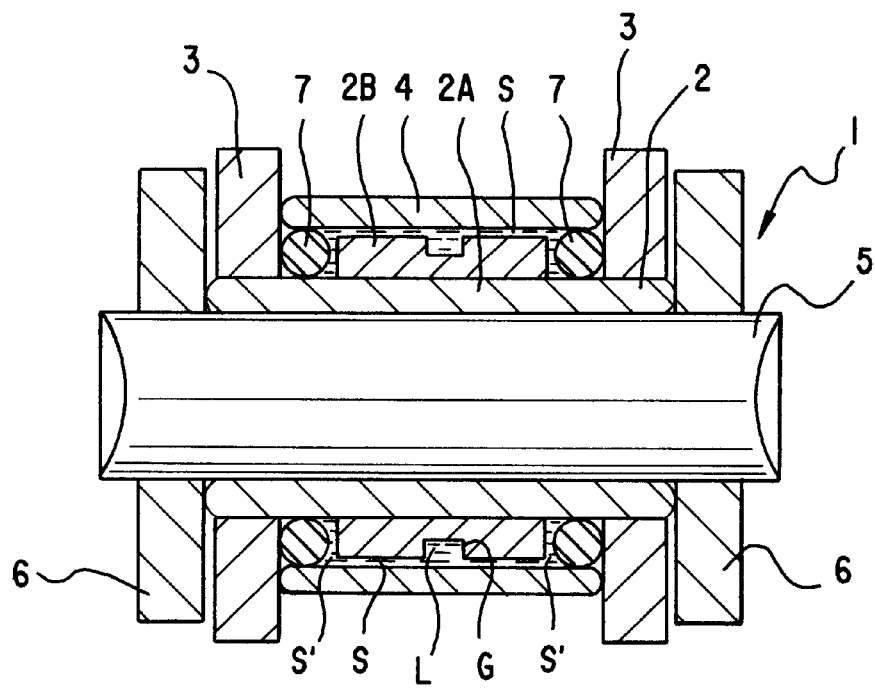
FIG. 1 is a cross-sectional view showing a first embodiment of a low noise roller chain according to the present invention.

Embodiments of the present invention will be explained hereinafter with reference to the drawing figures. FIG. 1 is a cross-sectional view showing a first embodiment of a low noise roller chain according to the present invention. A low noise roller chain 1 has a bushing 2 composed of a hollow cylindrical bushing body 2A and a substantially cylindrical large diameter portion 2B. Both ends of the bushing body 2A are fixedly fitted in a pair of inner plates 3, 3, respectively. The large diameter portion 2B is formed to be hollow and externally fitted over the bushing body 2A. Further, an oil groove G, which is circumferentially rectangular in section, is formed in an axially central position of the outer peripheral surface of the large diameter portion 2B.

A hollow thin cylindrical roller 4 is rotatably externally fitted over the bushing 2 between the inner plates 3, 3 on both sides thereof. The hollow thin cylindrical roller 4 is of a seamless construction, which is enhanced in mechanical strength by carburization hardening or similar as compared with a roller used for a normal roller chain. Further the hollow thin cylindrical roller 4 is enhanced in abrasive resistance by enhancing surface hardness.

There is a diameter difference of about 0.1 mm to 0.5 mm between the outside diameter of the large diameter portion 2B and the inside diameter of the hollow thin cylindrical roller 4, and a clearance S is formed which is capable of forming an oil film layer therebetween by the amount of difference between the diameters. A chain pin 5 rotatably extends through the bushing 2. Both ends of the chain pin 5 are fixedly fitted in a pair of outer plates 6, 6 arranged externally of the inner plates 2, 2.

On the other hand, O-rings 7, 7, for sealing an annular clearance between the inner peripheral surface of the hollow thin cylindrical roller 4 and the outer peripheral surface of the bushing body 2A, are fitted externally of the large diameter portion 2B of the outer peripheral surface of the bushing body 2A, and lubricating oil L, such as grease, is sealed into the clearance S, the oil groove G, and a clearance S' between both ends of the large diameter portion 2B of the bushing 2 and the O-rings 7, 7. The hollow thin cylindrical roller 4 is held to be positioned concentric with the center of the bushing 2 by the elasticity of the pair of O-rings 7, 7. In the state in which external force is not exerted on the hollow thin cylindrical roller 4, the clearance S is uniformly maintained in a circumferential direction, and lubrication oil moves into the clearance S to form an oil film layer.

The chain pin 5 rotatably extends through the bushing 2, and both ends thereof are fixedly fitted in a pair of outer plates 6, 6 arranged externally of the inner plates 3, 3.

The wall-thickness of the hollow thin cylindrical roller 4 is preferably not more than 70% of the wall-thickness of a roller used for a normal roller chain since the O-ring 7 intervenes relative to the bushing body 2A.

In the low noise roller chain 1 constructed as described above and in a state of not being engaged with a sprocket (not shown), a clearance S is uniformly maintained in a circumferential direction between the outer peripheral surface of the large diameter portion 2B of the bushing 2 and the inner peripheral surface of the hollow thin cylindrical roller 4 by the elasticity of the pair of O-rings 7, 7, and lubrication oil L moves into the clearance S to form an oil film layer.

When the hollow thin cylindrical roller 4 is engaged with the toothed surface of the sprocket and the shock load is applied to the outer peripheral surface of the hollow thin cylindrical roller 4, the O-rings 7, 7 on both sides of the large diameter portion 2B become elastically deformed so that the clearance S between the inner peripheral surface of the hollow thin cylindrical roller 4 and the outer peripheral surface of the large diameter portion 2B is narrow on the side on which the load is applied, and the lubricating oil L, which has filled in the clearance, S flows toward the opposite side on which the load is applied, where the clearance S is spread.

At this time, the pressure of the lubricating oil L is increased within the clearance S on the load side by the viscous resistance of the lubricating oil L to support the hollow thin cylindrical roller 4 on the outer peripheral surface of the large diameter portion 2B, and the energy of the collision between the toothed surface of the sprocket and the hollow thin cylindrical roller 4 is consumed by the viscous resistance to reduce the noise generated by the collision.

On the other hand, the oil groove G, formed in the outer peripheral surface of the large diameter portion 2B, disturbs the flow of lubrication oil L from the load side of the clearance S toward the counter-load side to increase the consuming amount of the shock energy caused by the flow of the lubricating oil L to increase the noise reducing effect. Further, since the lubricating oil L is stored in the oil groove G, there is no shortage of lubricating oil L in the clearance S between the inner peripheral surface of the hollow thin cylindrical roller 4 and the outer peripheral surface of the large diameter portion 2B of the bushing 2 and thus, the oil film layer is prevented from running out of lubricating oil L.

Figure 2:
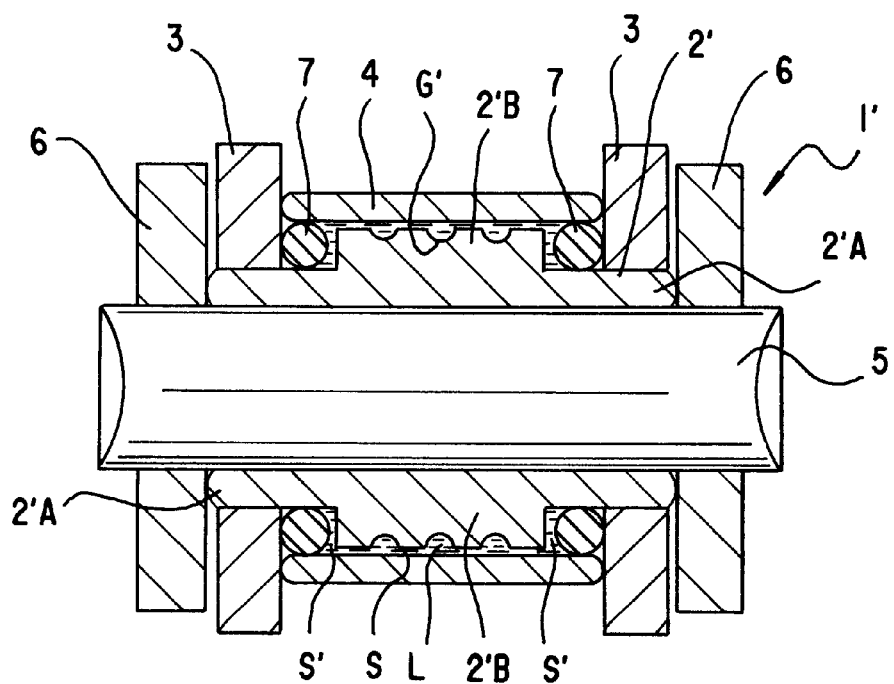
FIG. 2 is a cross-sectional view showing a second embodiment of a low noise roller chain according to the present invention.

FIG. 2 is a cross-sectional view showing a second embodiment of the low noise roller chain according to the present invention. A low noise roller chain 1' shown in the drawing figure is not different in construction from the low noise roller chain 1 shown in FIG. 1, except for the bushing 2'. Members common to both the embodiments are indicated in FIG. 2 by the same reference numerals as those of FIG. 1 and a description thereof will not be repeated here.

In the bushing 2' of the low noise roller chain 1' shown in FIG. 2, a bushing body 2'A and a large diameter portion 2'B are formed integrally, and three grooves G' which are semicircular in cross-section in a circumferential direction are formed at axial intervals to enhance the function of disturbing the flow of the lubricating oil L within the clearance S as compared with the first embodiment described above.

In the present embodiment, since the bushing 2' has the bushing body 2'A and the large diameter portion 2'B integrally formed to constitute a single part, the number of parts is less than that of the first embodiment described above, thus making manufacturing easier.

In the low noise roller chain according to the present invention, the formation of an oil groove in the outer peripheral surface of the large diameter portion of the bushing is preferred in terms of enhancing the noise reducing effect, as in the aforementioned first and second embodiments. However, alternatively, the oil groove may be eliminated and the outer peripheral surface of the large diameter portion may be designed to have a smooth cylindrical surface in order to simplify the processing of the bushing to reduce the manufacturing cost. Further, the shape of the oil groove is not limited to shapes shown in the previous embodiments, but the oil groove may be formed into thread-like, lattice-like or meshy configurations.

Further, instead of forming the oil groove, a number of independent concave portions capable of storing lubricating oil are scattered in the entire outer peripheral surface of the large diameter portion, or numerous fine concavo-convex portions may be formed by a shot-peening process or similar to obtain the effect of disturbing a flow of lubricating oil.

Figure 3:
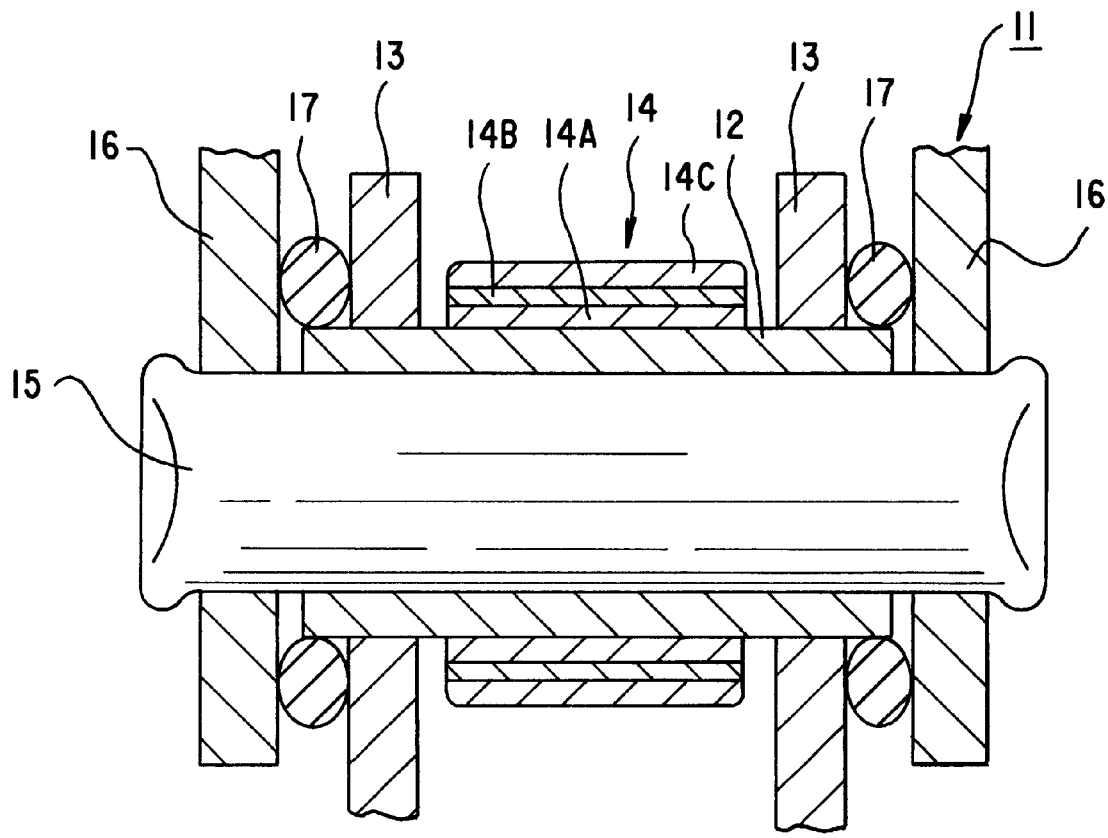
FIG. 3 is a cross-sectional view showing one example of a conventional low noise roller chain.
Figure 4:
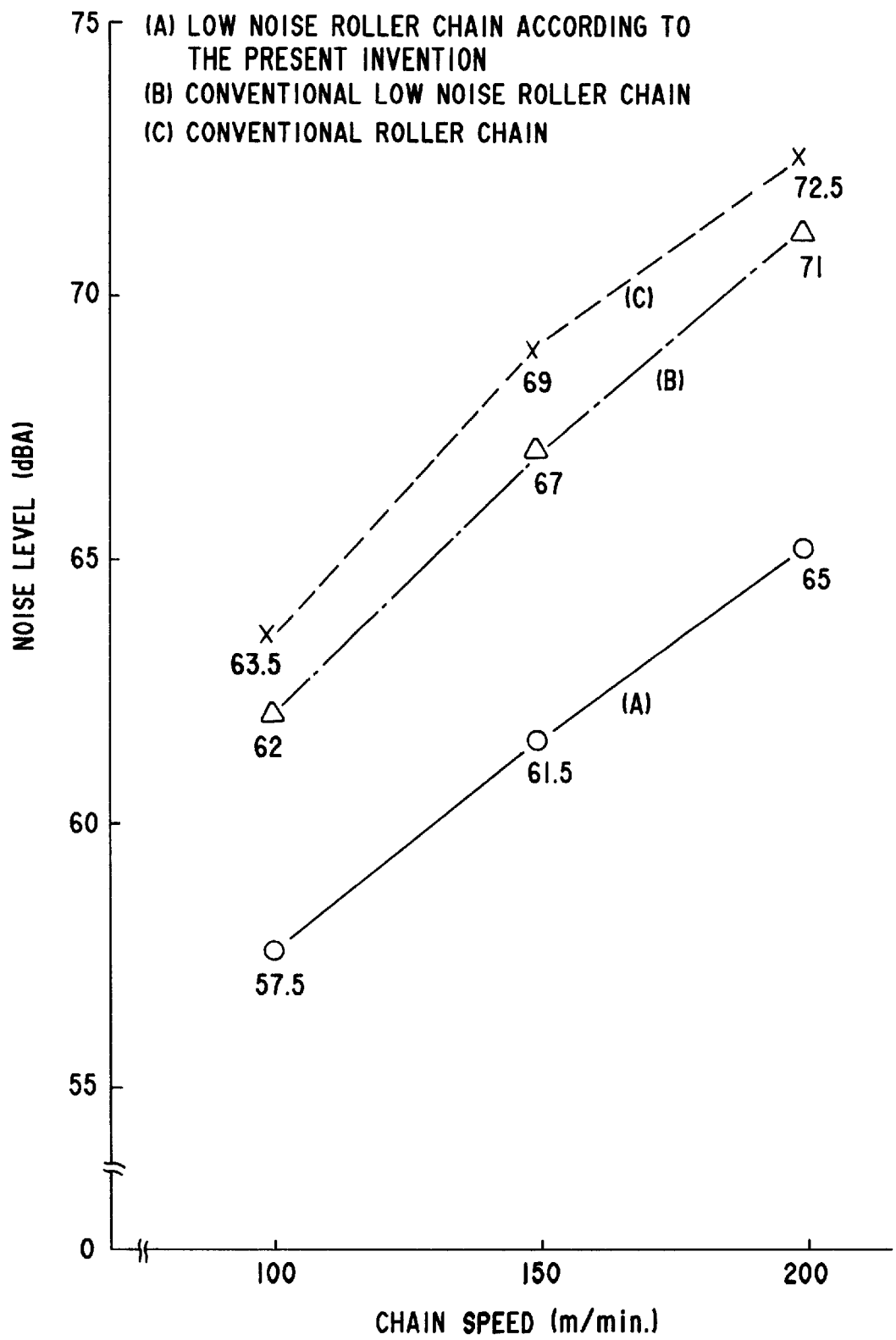
FIG. 4 is a graph comparing a noise level of the low noise roller chain according to the present invention with respect to the conventional roller chain and the conventional low noise roller chain.

FIG. 4 is a graph showing the actual measurement of a relationship between a chain speed (m/min.) and a level of noise (dBA) generated of the low noise roller chain (A) constructed in accordance with the first embodiment of the present invention with respect to the conventional low noise roller chain (B) shown in FIG. 3 and the conventional general roller chain (C) having no low noise construction.

As shown in FIG. 4, in the range of the actually measured chain speed, the low noise roller chain A of the present invention reduces in noise level by 6 dBA to 7.5 dBA as compared with the conventional general roller chain C having no low noise construction and reduces by 4.5 dBA to 6 dBA as compared with the conventional low noise roller chain B. It is understood that the chain A of the present invention is excellent in shock relief and vibration dampening properties, providing an extremely great noise reducing effect.

As described above, according to the low noise roller chain of the present invention, since the hollow thin cylindrical roller which is small in mass is supported on the outer peripheral surface of the large diameter portion of the bushing through the oil film layer of lubricating oil, the dampening properties of the energy of collision when the hollow thin cylindrical roller engages the toothed surface of the sprocket is extremely high to obtain the excellent noise reducing effect.

Further, the clearance, filled with lubricating oil between the outer peripheral surface of the large diameter portion of the bushing and the inner peripheral surface of the hollow thin cylindrical roller, is uniformly maintained in a circumferential direction by the elasticity of the O-rings fitted in both sides of the large diameter portion of the bushing directly before the hollow thin cylindrical roller collides with the toothed surface of the sprocket. Therefore, even if any position of the outer peripheral surface of the hollow thin cylindrical roller should collide with the toothed surface of the sprocket, uniform noise reducing effect is obtained.

Particularly in the case where the oil groove for storing lubricating oil is formed in the outer peripheral surface of the large diameter portion provided in the bushing, when the toothed surface of the sprocket collides with the hollow thin cylindrical roller, the flow of lubricating oil from the load side of the clearance between the outer peripheral surface of the large diameter portion of the bushing and the inner peripheral surface of the hollow thin cylindrical roller to the counter-load side is disturbed by the oil groove. Therefore, the consuming amount of the collision energy increases to enable the enhancement of the noise reducing effect.

Further, since the lubricating oil is stored in the oil groove, shortages of the oil film layer within the clearance between the inner peripheral surface of the hollow thin cylindrical roller and the outer peripheral surface of the large diameter portion can be prevented, and the noise reducing effect can be maintained for long periods of time without a supply of lubricating oil from an external source.

We claim:

1. A low noise chain, comprising:

a bushing having a hollow cylindrical bushing body and a substantially cylindrical large diameter portion at a central portion of said bushing body;

inner plates mounted on first and second ends of said bushing body, respectively;

a hollow thin cylindrical roller thinner than said central portion of said bushing body and having an inner peripheral surface which is opposed to an outer peripheral surface of said large diameter portion across a first clearance between said inner peripheral surface of said roller and said outer peripheral surface of said large diameter portion of said bushing, wherein said hollow thin cylindrical roller is capable of forming an oil film layer relative to an outer peripheral surface of said large diameter portion of said bushing, and said hollow thin cylindrical roller is rotatably and externally fitted on an external portion of said outer peripheral surface of said bushing between said inner plates on opposite sides of said hollow thin cylindrical roller;

a pair of O-rings for sealing said first clearance and a pair of second clearances communicating with said first clearance, each of said second clearances being defined between one of opposite ends of said large diameter portion of said bushing, an outer peripheral surface of said bushing body, and said inner peripheral surface of said hollow thin cylindrical roller;

outer plates arranged on both outer sides of said inner plates;

a chain pin rotatably extending through said bushing and having first and second ends mounted on said outer plates on both sides; and lubricating oil filled in said first and second clearances formed between said pair of O-rings, said inner peripheral surface of said hollow thin cylindrical roller and said outer peripheral surface of said bushing.

2. The low noise roller chain according to claim 1, further comprising an oil groove for storing said lubricating oil, wherein said oil groove is formed in said outer peripheral surface of said large diameter portion of said bushing.

3. The low noise chain according to claim 2, wherein said large diameter portion of said bushing is hollow and fitted over said bushing body.

4. The low noise chain according to claim 1, wherein said large diameter portion of said bushing is hollow and fitted over said bushing body.

* * * * *